UNITED STATES PATENT OFFICE.

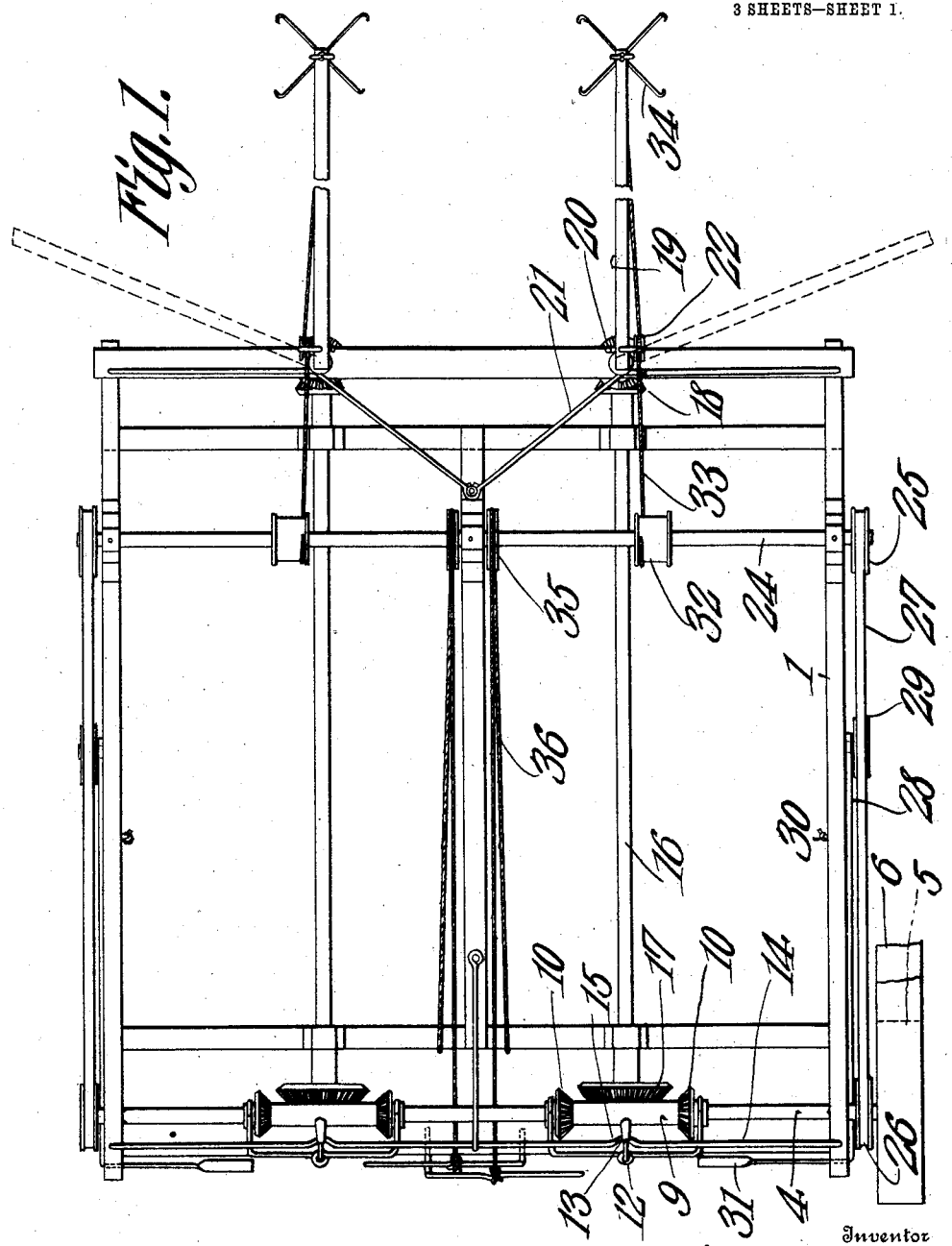

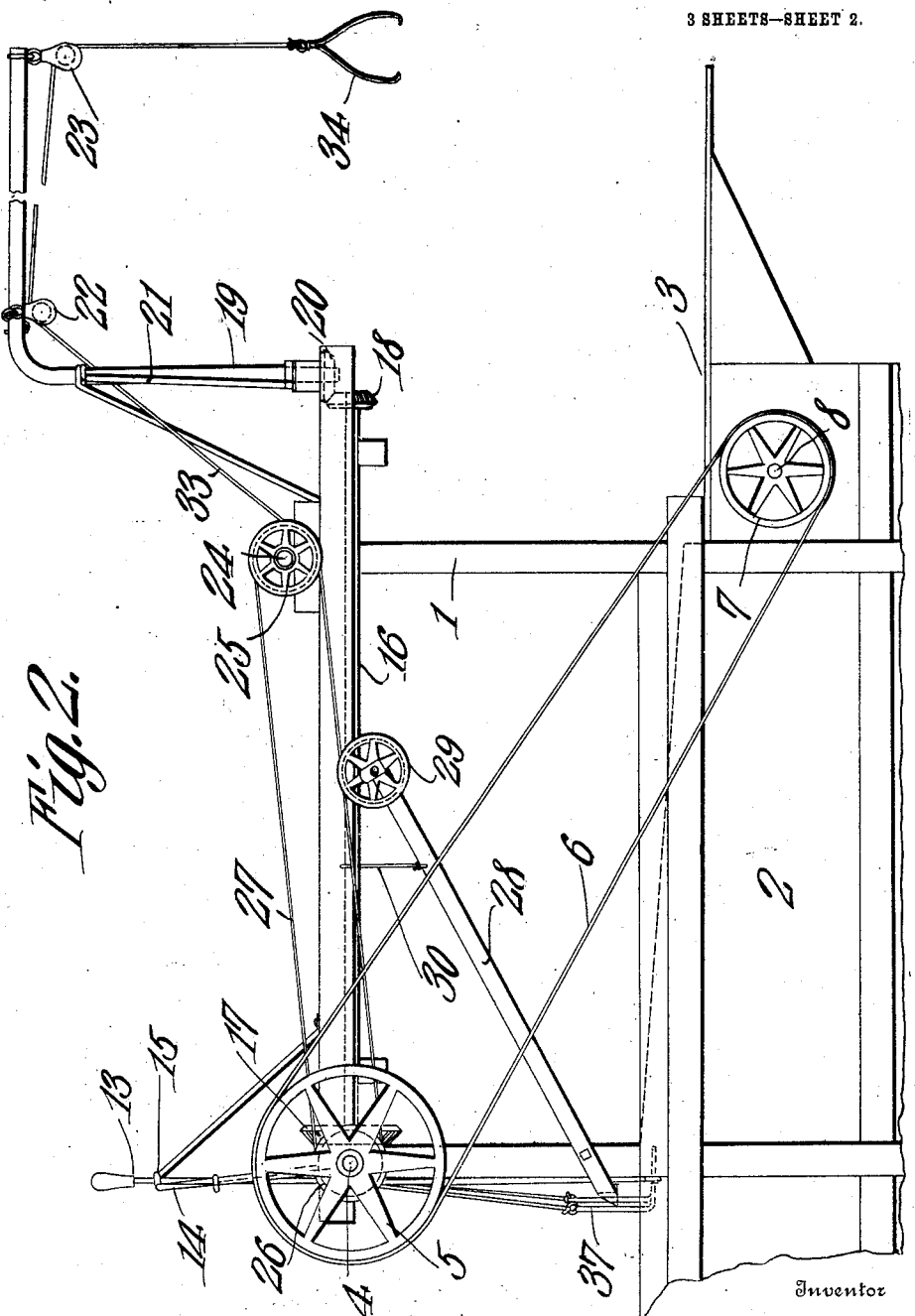

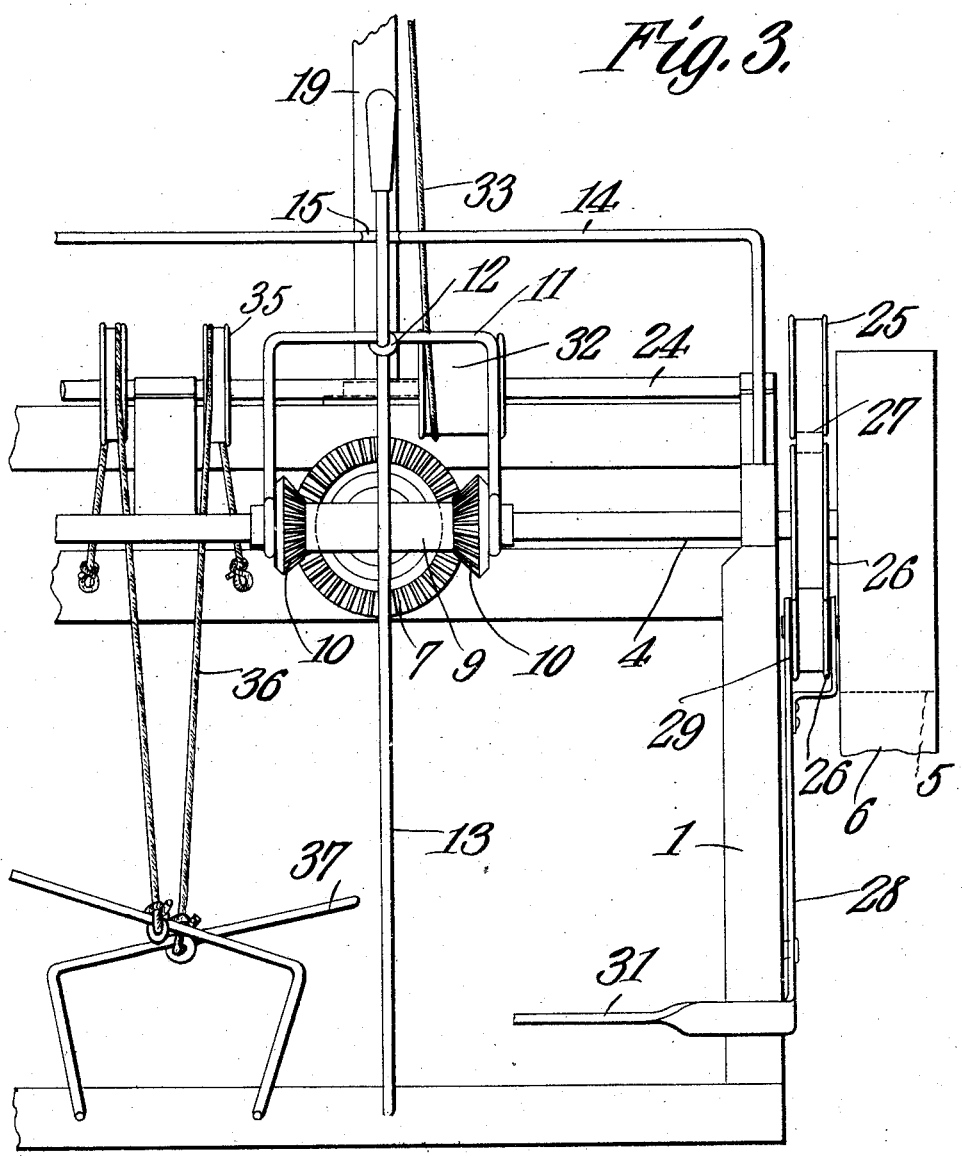

NICKLOS GLICK, OF SYLVAN GROVE, KANSAS.

GRAIN-PITCHING ATTACHMENT FOR THRESHERS.

No. 907,030.  Specification of Letters Patent.  Patented Dec. 15, 1908.

Application filed March 13, 1908. Serial No. 420,893.

*To all whom it may concern:*

Be it known that I, NICKLOS GLICK, a citizen of the United States, residing at Sylvan Grove, in the county of Lincoln and State of Kansas, have invented a new and useful Grain-Pitching Attachment for Threshers, of which the following is a specification.

This invention has relation to grain pitching attachments for threshers and similar machines and is of the nature of what is generally known as "self pitchers" and it consists in the novel construction and arrangement of its parts as hereinafter shown and described.

The object of the invention is to provide an attachment adapted to be mounted upon the body of a thresher in the vicinity of the grain receiving end thereof and which is provided with a shaft belted up with the cylinder or other rotating shaft of the thresher, the shaft upon the attachment carrying clutch members by means of which the said shaft may be thrown into gear with one or more shafts disposed at right angles thereto. A davit is pivotally mounted over the end of each of the last said shafts and is adapted to swing laterally in order that its outer ends may be vertically above the grain about to be lifted upon the thresher. A counter shaft is also mounted upon the attachment and is loosely belted with the first said shaft and means is provided for taking up the slack in the belt between the first said shaft and counter shaft. Winding drums are mounted upon the counter shaft and a tackle passes around each of said drums and through pulley blocks mounted upon the davit and depends from the end thereof. The depending ends of the tackles are provided with grain engaging devices, such as harpoons or grapples.

In the accompanying drawings: Figure 1 is a plan view of the attachment. Fig. 2 is a side elevation of the same, and Fig. 3 is an end elevation of a portion of the same.

The attachment consists of the frame 1 which is adapted to be mounted upon the body of the thresher 2 in the vicinity of the grain receiving end 3 thereof. It is upon the frame 1 that the grain handling means are mounted and as the said means are shown as being arranged in two sets, both alike, a description of one set will answer for both. The shaft 4 is journaled for rotation at one end of the frame 1 and is provided with a belt pulley 5. The belt 6 passes around the pulley 5 and the pulley 7 mounted upon the cylinder shaft 8 of the thresher. The belt 6 may pass around a pulley mounted upon any other rotating shaft of the thresher. The shaft 4 is non-circular and the sleeve 9 is mounted thereon and rotates therewith but may slide longitudinally with relation thereto. The beveled pinions 10 are located at the ends of the sleeve 9 and rotate with the same. The yoke 11 is attached at its ends to the ends of the sleeve 9 and is provided at an intermediate point with a loop or eye 12 through which the lever 13 passes. Said lever 13 is fulcrumed at its lower end to the end of the frame 1 and at its upper portion is adapted to move along the rail 14 mounted upon the frame 1. The said rail 14 is provided with an indentation 15 which is in vertical alinement with the fulcrum point of the lever 13 and which is adapted to receive the said lever when both of the pinions 10 are out of gear or mesh with an intervening pinion as will be hereinafter explained.

The parts are so assembled that the lever 13 is held by resiliency in the indentation 15 against ordinary jars and vibrations but when it is desired to swing the lever to one side or the other of the indentation the said lever is sprung laterally when it may be readily moved along the rail 14.

The shaft 16 is journaled for rotation upon the frame 1 and is disposed at a right angle to the shaft 4. The beveled pinion 17 is mounted upon the shaft 16 and is located in the paths of the pinions 10. Said pinions 10 are normally out of mesh with the pinion 17 as above alluded to. The beveled pinion 18 is fixed to the opposite end of the shaft 16. The davit 19 is pivotally mounted in the frame 1 over the end of the shaft 16 and the lower end of the davit is provided with a beveled pinion 20 which meshes with the pinion 18. Said davit is mounted to swing horizontally and the braces 21 connect the upper portion of the davit with the frame 1. The pulley block 22 is mounted upon the upper portion of the davit 19 and the pulley block 23 is mounted upon the upper outer portion of the said davit. The counter shaft 24 is journaled for rotation upon the frame 1 and is provided at its end with a belt pulley 25. The pulley 26 is mounted upon the shaft 4 and the belt 27 passes loosely around the pulleys 25 and 26. The lever 28 is fulcrumed to the side of the frame 1 and is provided at its upper end with a roller 29 which is adapted to bear against the under side of the belt 27 and take up the slack therein and stretch the belt taut about the pulleys 25 and 26. The flexible member 30 is attached at one end to the frame 1 and at its opposite end to the lever 28 and holds the roller 29 in the vicinity of the belt 27. The lower end of the lever 28 is carried around the end of the frame 1 and terminates in the foot pedal 31. The drum 32 is mounted upon the shaft 24 and the tackle 33 passes around the said drum and over the pulleys in the blocks 22 and 23 and is provided at its free end with the grain engaging device 34 which may be a harpoon, grapple or similar device. The wheel 35 is mounted upon the shaft 24 and the flexible band 36 is attached at one end to the frame 1 and passes around the wheel 35 and is attached at its other end to the lever 37 fulcrumed at the end of the frame 1. The free end of the lever 37 is disposed toward the free end of the pedal 31 of lever 28, that is to say, the free ends of the said parts are oppositely but in comparatively close proximity to each other with the lever 13 located between them.

The operation of the device is as follows: Through the instrumentality of the belt 6 passing around the pulleys 5 and 7 the shaft 4 is continuously rotated. When it is desired to swing the davit horizontally the lever 13 is moved laterally with relation to the notch 15 so that one of the pinions 10 is moved into mesh with the pinion 17. As the sleeve 9 rotates with the shaft 4 rotary movement is transmitted from the said shaft through the said sleeve and meshing pinions 10 and 17 to the shaft 16. From the shaft 16 movement is transmitted to the davit 19 from the pinions 18 and 20. Thus the said davit is swung laterally and the direction in which it is swung depends upon the direction in which the lever 13 is moved. The upper end of the davit 19 is swung beyond the side of the frame 1 when the grain upon a stack or wagon is to be grappled. After the grain is caught by the device 34 it is elevated, as will be hereinafter described, and the davit 19 is swung back over the grain table 3 when the grain is released and deposited upon the said table. After the grain has been grappled at the stack and when it is to be raised the operator steps upon the pedal 31. His weight will cause the power end of the lever to descend and the working end thereof to rise so that the roller 29 is moved against the under side of the belt 27 and stretches the same around the pulleys 25 and 26. Thus rotary movement is transmitted from the shaft 4 to the counter shaft 24 which carries around with it the drum 32. As the said drum rotates the tackle 33 is wound thereon and the grain is elevated. When the grain has become sufficiently elevated the operator steps from the pedal 31 on to the free end of the lever 37 and thus his weight is transferred from one of the said parts to the other. Under the operator's weight the lever 37 is depressed which draws the band 36 tight around the wheel 35 and the tackle 33 cannot unwind from the drum 32 by reason of the weight of the suspended grain. After the grain has been swung over the table 3 the operator may gradually move his weight from the lever 37 and thereby permit the wheel 35 to slip under the band 36 so that the tackle 33 may unwind from the drum 32 and the grain gradually lower to the grain table from thence it enters the thresher.

Having described my invention, what I claim as new and desire to secure by Letters Patent is:—

1. A device of the character described comprising a frame, a davit mounted thereon, a drum journaled for rotation, a tackle passing around the drum and over pulleys upon the davit, a grain securing device carried by the tackle, means for turning the davit, means for rotating said drum and means for holding the drum in a stationary position, a lever mechanism controlling the means for rotating the drum, a lever mechanism for controlling the means for holding the drum stationary, said mechanisms having their free ends oppositely disposed and relatively close together and a lever mechanism for controlling the means for turning the davit.

2. A device as described comprising a frame, a davit pivotally mounted thereon, means for swinging the davit, a tackle mounted for movement upon the davit, a drum journaled for rotation and connected with the tackle, means for rotating the drum, means for holding the drum in fixed position, a lever mechanism for controlling the means for rotating the drum, a lever mechanism for controlling the means for holding the drum in fixed position, said mechanisms having their free ends oppositely disposed and within relatively close proximity and adapted to be operated by the weight of an operator which may be transmitted from one lever mechanism to the other, and a lever mechanism for operating the means for swinging the davit, the last said lever mechanism being located between the first lever mechanisms.

In testimony that I claim the foregoing as my own, I have hereto affixed my signature in the presence of two witnesses.

NICKLOS GLICK.

Witnesses:
  JOHN P. LANG,
  LOUIS DELUCH.